March 31, 1964 G. SMITH 3,127,007
TOBACCO-MANIPULATING MACHINES
Filed Nov. 20, 1961 2 Sheets-Sheet 1

INVENTOR
George Smith

By Watson, Cole, Grindle & Watson
ATTORNEYS

March 31, 1964  G. SMITH  3,127,007

TOBACCO-MANIPULATING MACHINES

Filed Nov. 20, 1961  2 Sheets-Sheet 2

INVENTOR
George Smith
By Watson, Cole, Grindle & Watson
ATTORNEYS

# United States Patent Office 3,127,007
Patented Mar. 31, 1964

3,127,007
TOBACCO-MANIPULATING MACHINES
George Smith, London, England, assignor to Molins Machine Company Limited, London, England, a British company
Filed Nov. 20, 1961, Ser. No. 153,620
Claims priority, application Great Britain Dec. 1, 1960
3 Claims. (Cl. 198—193)

This invention relates to machines in which cut tobacco is formed into a continuous tobacco filler, namely, continuous rod cigarette-making machines.

Machines of this kind are known in which the continuous filler is conveyed on an air-previous conveyor, air being passed through the filler and the conveyor to hold the filler to the conveyor. In some cases the filler is beneath the conveyor and is held thereto by suction.

Examples of such a machine are disclosed in United States Patent No. 3,030,965, granted April 24, 1962. In such machines, tobacco particles are fed into a passage which extends to a perforated conveyor band, and a high velocity air stream is caused to flow through the passage so as to carry the tobacco particles to the conveyor. A suction chamber extending along the conveyor band draws air through the conveyor. In these examples a continuous filler is formed beneath the conveyor band and held thereto by suction.

It will be understood that an air pervious conveyor carrying a filler, whether the filler is above or beneath the band, requires supporting to withstand the pressure due to the airflow through the filler and the band. In the case of the machines disclosed in the specification mentioned the perforated band is rather narrow, for reasons connected with the design of other parts of the machine, and the band can only be supported on its unperforated margins which are quite narrow. In these particular machines, suction of about 14" of water is employed, that is, a pressure of about ½ lb. per square inch and, as the operative run of a band is several feet long, the total pressure on the band is considerable. The friction caused by such pressures is very considerable and the driving of the band is a difficult problem since it should move at the linear speed of the final filler or rod. The band can be driven by a supporting pulley or by a pair of friction rollers but variable slip occurs because of the friction between the band and its fixed supports. As in the case of the machines described in the specification referred to, the supports consist of narrow guides, the wear on the guides is considerable and no available materials have been satisfactory for any length of time. Also, of course, the band is subjected to heavy wear.

An object of the invention is to provide a cigarette-making machine having an air-pervious conveyor band on which a continuous filler is conveyed and held thereto by airflow through the filler and the band, said machine comprising means for supplying pressure air to a surface of the band to provide a counter-pressure to the pressure resulting from the airflow which holds the filler to the band. The part of the band subjected to the pressure air depends on the mechanical details of the construction of the machine but, in the case of machines constructed according to the specification referred to, the pressure air is applied along the margins of the band. To this end the guides, which are recessed to provide a track for the band, may be of hollow formation with pipes or the like through which pressure air may pass to the interior of the guides, and small apertures communicating from the interior of each guide and with the surface of the recess in which the band runs may be provided whereby pressure air may be caused to impinge on the band margins. Means may be provided for adjusting the pressure of the pressure air and thus it is possible to neutralize band friction due to the filler-holding airflow partly or wholly. When the pressure on the band margins equals the total pressure on the band due to the airflow which holds the filler to the band, the band becomes completely airborne.

Further objects and features of the invention will be apparent from the following description, taken in connection with the accompanying drawings, in which FIGURE 1 is a front elevation, partly in section of a continuous-rod cigarette-making machine embodying the invention.

Figure 1:
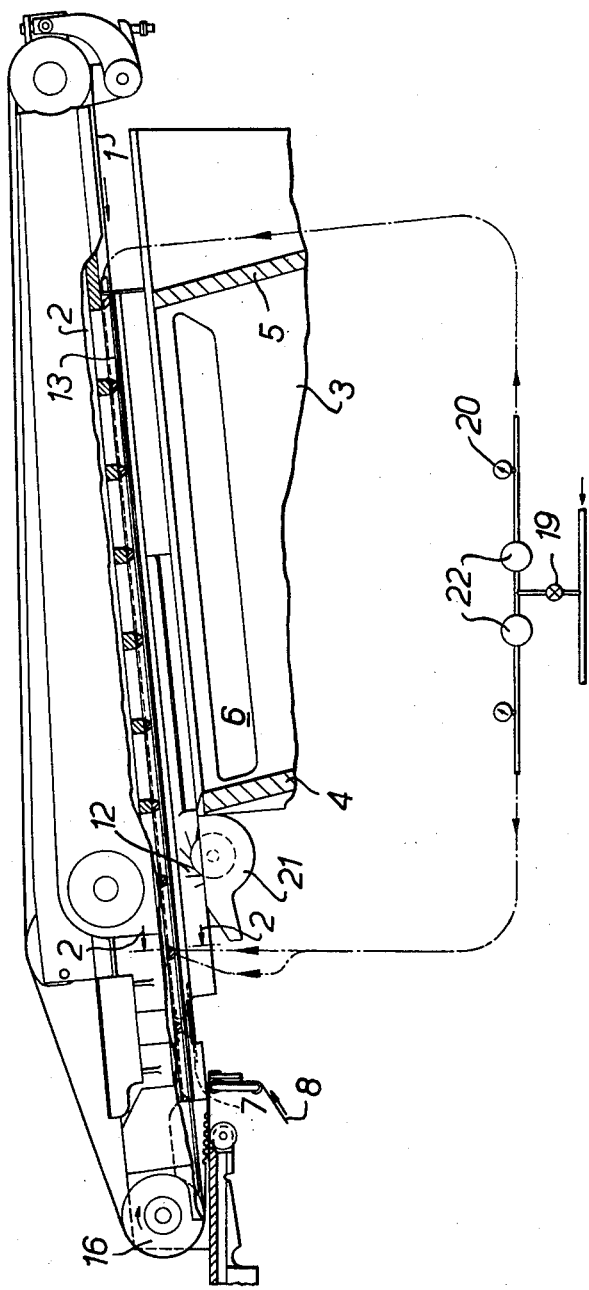

The apparatus shown in FIGURE 1 forms part of a continuous rod cigarette-making machine which is basically similar to the machine disclosed in co-pending Unated States Patent No. 3,030,965 referred to above.

Referring to FIGURE 1, the apparatus comprises a perforated metal conveyor band 1 arranged to move, in the direction shown by the arrow, beneath a suction chamber 2 which draws air upwardly through the conveyor band.

A passage formed by side walls 3 and end walls 4 and 5 extends upwardly toward the band 1. Means (not shown) are provided to supply air to the lower end of the passage, and the arrangement is such that air flows up the passage in a continuous stream at high velocity. Tobacco-feeding means (not shown) are arranged to feed tobacco particles into the passage in such a way that they are impelled upwardly at high velocity to the band 1 by the air stream, and build up on the band to form a filler.

Some of the air which flows up the passage is drawn off through an opening 6 by suction means.

Both the band 1 and the suction chamber 2 extend a substantial distance beyond the end wall 4 of the passage, that is, to the left of the wall 4 as viewed in FIGURE 1, and air is drawn through that part of the band from atmosphere. This enables the tobacco filler, which has been built up on the band in the passage, to be held suctionally on the underside of the band 1. A trimming device is provided to remove surplus tobacco from the tobacco filler. This device comprises a pair of cooperating discs 7 (one of which is visible in FIGURE 1) arranged beneath the band 1. Beyond the trimming device, the band 1 extends over a paper web 8, onto which the tobacco filler is led while still suctionally held on the band 1; when suction is cut off from the band, the filler is released and is thereafter conveyed by the paper web, which is then wrapped around it to form a continuous wrapped rod.

Figure 2:
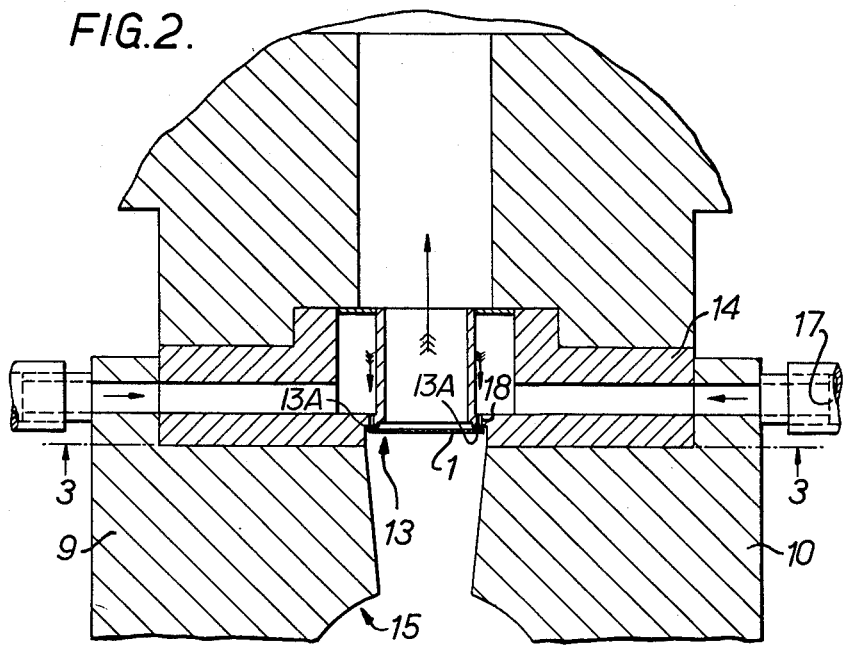
FIGURE 2 is a cross-section of FIGURE 1 on the line 2—2 drawn to a larger scale.

Referring mainly to FIGURE 2, the band 1 runs along a trough formed by side guide members 9 and 10, which form continuations of the walls 3. The band itself is housed in a recess 13 as shown in FIGURE 2, which provides shoulders 13A engaging the edge portions of the band 1. The recess is formed in rails 14 fixed on top of the members 9 and 10. The guides 9 and 10 (which form the uppermost parts of the side walls 3 of the passage) are, to the left of the end wall 4 as viewed in FIGURE 1, recessed at 15 to provide an enlarged portion of the trough. Between the recessed parts of the side guide members 9 and 10 is mounted a rotatable closure device or wheel 12, FIGURE 1, which, so far as is practicable, prevents ingress of air past the wall 4, as will now be explained.

The tobacco filler when fully built up on the band 1, and when carried by the latter out of the passage past the end wall 4, usually extends downwardly from the and a short distance into the widened portion of the trough, that is, between the recessed parts 15 of the side guides.

The rotatable wheel 12 comprises a hub portion provided with a number of flat paddles or blades equally spaced around the periphery of the hub and inclined outward at equal angles. The outer ends of the paddle elements are shaped so as to fit the local cross-section of the side guides 9 and the widths of the paddle elements are such as to fit closely between the guide members 9 and 10.

The wheel 12 is driven mechanically and each paddle lightly contacts the filler as it reaches the topmost part of its travel. In addition, the paddle of the lower part of the wheel at any instant engages closely with the interior of a housing 21 and this housing seals the end wall 4. Therefore the gap between the filler and the end wall 4 is substantially closed, at least to a sufficient extent to prevent any serious flow of air into the passage from outside.

As stated earlier in the specification, suction of about 14" of water causes an upward airflow as indicated by the large feathered arrow in FIGURE 2 and the pressure on the band 1 is therefore considerable. It will also be noted from FIGURE 2 that the band is supported by the very narrow faces 13A of the recess 13. In earlier constructions these recesses were provided in a strip of hard wearing material, but all conceivable materials tried wore out very rapidly and/or speedily ruined the band. This is driven, as can be seen from FIGURE 1, by a driving pulley 16. The intense friction often causes the band to slip and the band should move at rod speed. It is not practicable to drive this particular band in any other way than by a friction drive of some kind. To overcome these difficulties pressure air is fed through pipes 17 and into the hollow interiors of the rails 14. The rails are perforated at 18, as shown in FIGURE 2, which is drawn to a greatly enlarged scale, and the pressure air moving through the perforations 18 in the direction of the small feathered arrows presses on the margins of the band 1.

Figure 3:
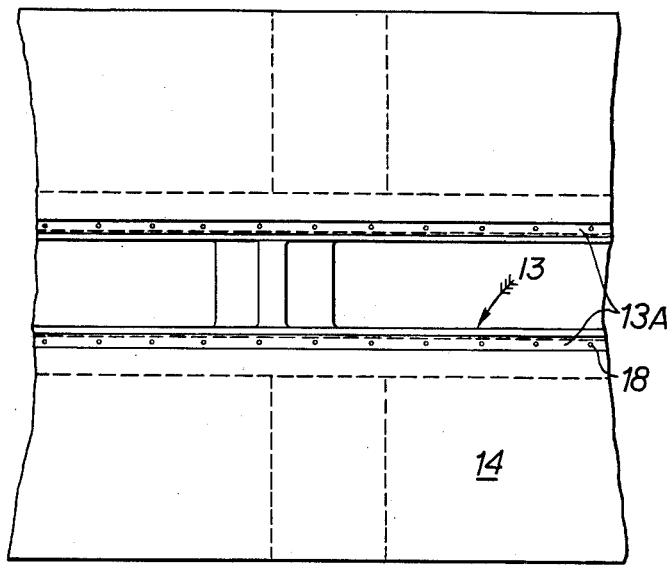
FIGURE 3 is a section of FIGURE 2 on the line 3—3 and to the same scale.

FIGURE 3 shows the perforations along the length of the rails 14. The holes are quite small and, if spaced as shown, they provide sufficient counterpressure to render the band fully airborne. This pressure can be regulated by a valve 19, FIGURE 1, to be of any desired value, as it may not always be necessary to have the band completely airborne. If undue wear of rails and band and slip are avoided, it may be economic to save the pressure air by operating at reduced pressure.

Pressure gauges 20 and air filters 22 are provided as shown in FIGURE 1.

What I claim as my invention and desire to secure by Latters Patent is:

1. In a continuous-rod cigarette-making machine having an air-pervious conveyor band on which a continuous filler is conveyed and held thereto by airflow through the filler and the band, the improvement comprising guides for the air-pervious conveyor band, said guides being recessed to provide a track for the side margins of the band, perforations in said recessed parts of the guides, and means for applying pressure air to said perforations to impinge on the side margins of the band and provide a counter pressure to the pressure resulting from the airflow which holds the filler to the band.

2. In a machine as claimed in claim 1 wherein said guides for the air-pervious conveyor band are of hollow formation and in which the perforations in the recessed parts pass through to the hollow interior of the guides and pipes are provided communicating with the hollow interior whereby pressure air may be fed to said perforations.

3. In a machine as claimed in claim 1, means for adjusting the pressure of the pressure air whereby friction between the band and the track formed by the recesses due to said airflow may be partly or wholly neutralized.

References Cited in the file of this patent

UNITED STATES PATENTS

| 756,600 | Dodge | Apr. 5, 1904 |
| 1,321,686 | Varden | Nov. 11, 1919 |
| 2,407,100 | Richardson | Sept. 3, 1956 |

FOREIGN PATENTS

| 445,044 | Great Britain | Apr. 2, 1936 |
| 764,551 | Great Britain | Dec. 28, 1956 |